2 Sheets—Sheet 1.

J. TIXIER.

STOP WATCH.

No. 10,756. Reissued Aug. 17, 1886.

Witnesses,
Geo. H. Strong.
J. H. Bonnell.

Inventor
John Tixier
By Dewey & Co.
Attys.

J. TIXIER.

STOP WATCH.

No. 10,756. Reissued Aug. 17, 1886.

Witnesses,
Geo. H. Strong.
J. B. Louise.

Inventor,
John Tixier
By Dewey & Co.
Attys

UNITED STATES PATENT OFFICE.

JOHN TIXIER, OF SAN FRANCISCO, CALIFORNIA.

STOP-WATCH.

SPECIFICATION forming part of Reissued Letters Patent No. 10,756, dated August 17, 1886.

Original No. 333,792, dated January 5, 1886. Application for reissue filed March 1, 1886. Serial No. 193,628.

*To all whom it may concern:*

Be it known that I, JOHN TIXIER, of the city and county of San Francisco, State of California, have invented an Improvement in Stop-Watches; and I hereby declare the following to be a full, clear, and exact description of the same.

My invention relates to certain improvements in stop-watches; and it consists of a mechanism by which an independent hand may be started or stopped at any point in its circuit and returned to the original starting-point, this mechanism being so constructed and arranged that I am enabled to dispense with a number of the wheels and springs which are ordinarily used in this class of mechanism.

Figure 1:
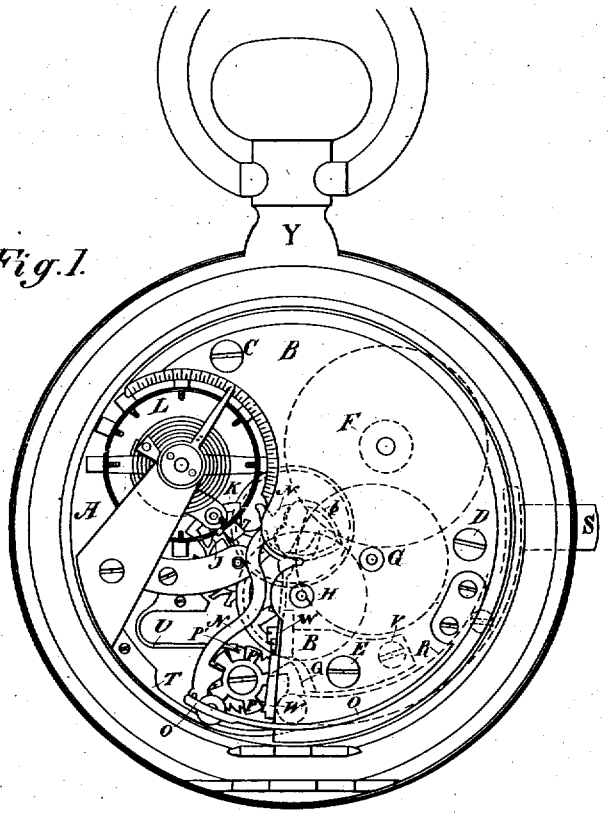
Figure 2:
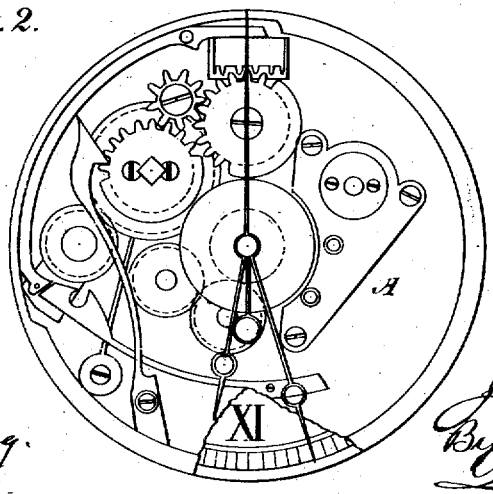
Figure 3:
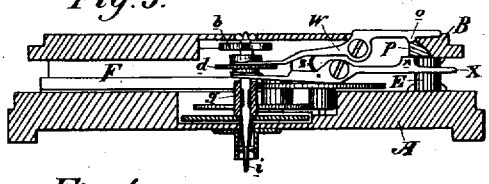
Figure 4:
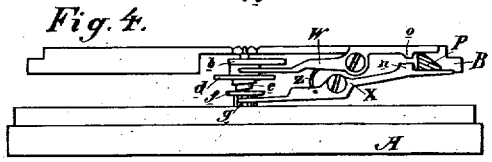
Figure 5:
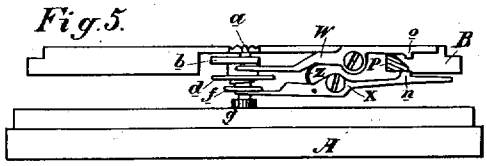
Figure 6:
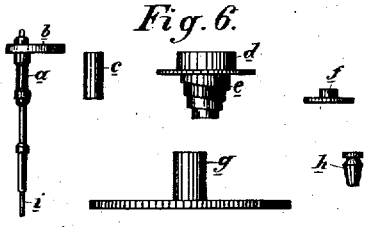
Figure 7:
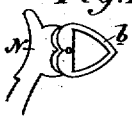
Figure 8:
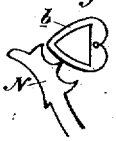
Figure 10:
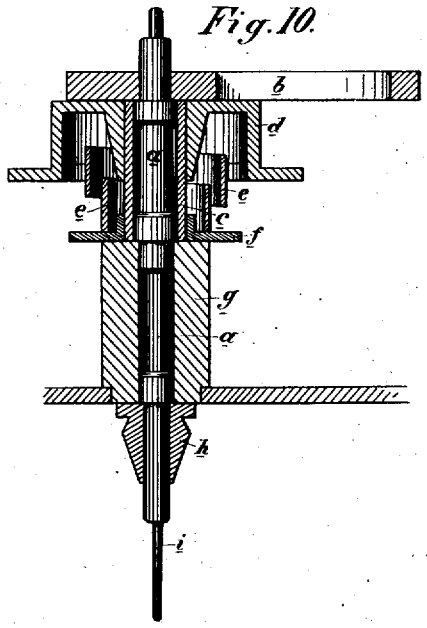
Figure 9:
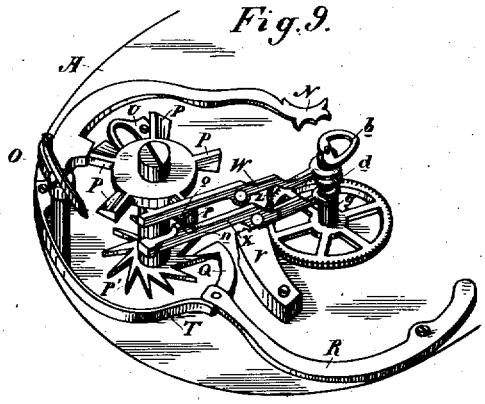

Referring to the accompanying drawings for a more complete explanation of my invention, Figure 1 is an enlarged plan view showing the mechanism from the rear. Fig. 2 is a plan view showing the winding mechanism from the front with the dial removed and the hands in place. Fig. 3 is a vertical transverse section showing mechanism of the portion with the hand at 60. Fig. 4 shows a vertical transverse section of these parts when running. Fig. 5 is a similar section showing positions of parts when the hand is stopped. Fig. 6 is an enlarged view of the parts separated, which are shown in section in Fig. 3. Figs. 7 and 8 are enlarged views of the heart and end of bar N. Fig. 9 is a perspective of the stop mechanism. Fig. 10 is a sectional view showing the parts illustrated in Fig. 6 in position on the central staff, *a*.

In the construction of stop-watches the mechanism between the going parts of the watch and the independent hand, which is used as a timer, usually consists of a train of gearing with a device by which it may be thrown into or out of action at will. The friction caused by the running of this extra mechanism interferes with the regular running of the watch, (to which the stop mechanism is ordinarily connected;) and the object of my invention is to so reduce the parts as to simplify the construction and reduce the friction to a minimum. In order to do this I employ a central staff which has the timing-hand fixed to it; also a heart-shaped cam by which the hand may be returned to its ordinary position of starting whenever desired.

The driving mechanism by which the staff and hand are moved is loosely mounted upon the staff, and in connection with it I employ a mechanism by which it is caused to drive the staff or to be thrown out of action at will. This mechanism I will now proceed to describe.

A and B are the two plates of the watch held together by pillars and screws C, D, and E. The barrel F gears with the pinion G, and this again with the wheels, as shown.

K is the anchor, and L the balance-wheel, these parts not differing materially from those shown in other watches with second-wheel in the center.

*a* is the central staff, upon the pivot *i* of which the center seconds-hand is fixed. The heart *b* is secured to the staff.

*g* is a wheel and pinion turning loosely around the staff and held in place by the roller *h*.

*c* is a sleeve or roller turning loosely upon the staff *a*, one end being close to the heart *b*, and the other end is close to the pinion *g*.

*d* is a small barrel, which fits loosely around the roller *c*, and has a spiral coiled spring, *e*, within it.

*f* is a disk, or what I term a "barrel-cover," which fits the roller *c*, and which is forced into contact with the end of the pinion *g* by the action of the spring *e*. It will be seen that if the spring *e* is removed, all the parts *c*, *d*, *f*, and *g* upon the staff *a* will turn freely, the heart *b* and the roller *h* being the only parts besides the seconds-hand which are fixed to the staff. Under these conditions the wheel and pinion *g* may revolve freely about the staff *a* without moving it or the hand which is attached to it. If, however, the spring *e* be allowed to expand lengthwise, it presses the end of the barrel *d* against the heart *b* and also presses the disk or cover *f* against the end of the pinion *g*, thus producing a sufficient friction by tightening these parts together, so that the wheel and pinion will act to drive the staff and the timing-hand.

W and X are two levers, the inner ends of which are forked so that the fork of the lever W rests upon the top of the flange shown on barrel *d*, and the fork of the lever X extends below the disk or barrel-cover *f*. These two levers are pressed apart by a curved spring, Z, so that when not otherwise actuated they do not press the spring *e* together, but allow it to act upon the barrel *d* and disk *f*, as before described, pressing them against the heart and the end of the pinion *g* and causing sufficient friction, so that the movement of the pinion will be transmitted to the staff. When it is desired to stop the staff and the hand, which is driven by it, it is done by the action of a double wheel, P P′, fixed upon a staff and having five teeth above and fifteen below. These two wheels are operated by a pusher, S, acting through the curved lever R and the click or pawl Q, the lever being fastened to the bottom of the plate A by a pivot-screw.

T is a spring, which presses upon the pawl or click and the lever R.

U is a spring that acts upon a ratchet wheel. The outer end of the lever-arms W and X extend above and below the teeth P, so that when this wheel revolves these teeth pass between the outer ends of these two levers, as plainly shown in Figs. 3, 4, and 5. The upper lever, W, has a lug or projection, *o*, extending downward from it. The lower lever, X, has a lug, *n*, which is wider than the lug *o*, and the teeth P are beveled, as shown in Figs. 3, 4, and 5, so that they are longer upon the bottom than upon the top.

N is a lever having one end pivoted near the toothed wheel P, and the opposite end is formed with three points or teeth, which press against the edge of the heart *b*, this lever being pressed against the heart by a spring, O. This lever N has a lug or projection, which extends between the teeth of the wheel P when the opposite end of the lever is resting against the heart, but when the lever P is turned around by the action of the pusher S and lever R, and the click or pawl Q and ratchet, a tooth of the wheel P will press upon the projection on the lever N and force it outward, so that it will rest upon the top of a tooth, thus moving the opposite end of the lever away from the heart, leaving the heart and staff free to rotate. The action of this device will then be as follows: Starting with the parts in such a position that the spring *e* is expanded, so that all the parts on the staff *a* are caused to rotate together by frictional pressure, the center seconds-hand will indicate divisions of time to one-fifth of a second. If the pusher S be now pushed inward, it acts through the lever R and pawl Q to turn the ratchet-wheel P′ forward one tooth. This causes the bottom of one of the teeth P to press the lever X so that its forked end will press on the lower part of the spring *e* by means of the disk or barrel-cover *f*, so that the latter is out of contact with the pinion *g*. This allows the pinion to turn loosely upon the staff, and the latter immediately stops, as shown in Fig. 5. When the pusher S is pressed the second time, the projection *n* of the forked lever X will slide along on the toothed wheel P without changing the position of its lever; but the projection *o* of the fork W will be brought on top of the toothed wheel P, so that the opposite or forked end of the lever W will press the barrel *d* toward the cover or disk *f*, and the staff *a* will then be entirely free. At this moment the lug on the lever N will fall between two of the teeth P, and the spring acting upon the lever forces its toothed end against the heart *b*, thus turning it around so as to bring the hand back to 60, or the starting-point, as shown in Figs. 3 and 1. When the pusher is pressed a third time, the lever N will again be forced back, as is more plainly shown in Fig. 9, thus leaving the heart free, and at the same time the two lugs *o* and *n* on the forks of the levers W and X will fall between two of the teeth of the wheel P, as shown in Fig. 4. By this action the forked ends of the levers are separated, so as not to press on either of the parts *d* or *f*, and the spring *e* will press these parts outward against the heart *b* and the pinion *g*, so as to unite all parts on the staff and cause them to act as one. The staff and center seconds-hand will immediately commence moving and will continue to run until the movement of the pusher, which was first described and the action of which is shown in Fig. 5. By this improvement I do without a number of wheels with small teeth, and also springs which are necessary to stop the movement or play between the teeth of the gears and in the pivot-holes. I obtain more precision in the hand which shows the seconds, and less cause for stopping in the movement. The end of the lever N being formed in three points, as before described, the middle one corresponds with the central pivot of the staff, which carries the heart, and presses upon the heart, guiding it while turning around, as shown in Fig. 8. When the heart has reached the point which brings the hand to its starting-point or 60, the two outside teeth press upon each side of the head, thus holding it very steady, while the middle tooth is opposite the depression in the head of the heart and does not touch it, as shown in Fig. 7.

In some cases it may be found advisable to omit the loose roller *c* upon the staff *a*, as it is not indispensable, and the small barrel *d* and cover *f* might be replaced by one or two springs or devices, against which the spring *e* could press. The forks W and X might also be replaced by springs and levers, which work on the side of the toothed wheeled P in the same manner as the lever N; but these changes are simply mechanical, and will be well understood by any one conversant with the art, as they do not essentially alter the action of my apparatus.

Having thus described my invention, what I claim as new, and desire to secure by Letters Patent, is—

1. In a stop-watch, the independent staff having the seconds-hand and the returning-heart secured to it, the driving-pinion turning loosely upon it, a longitudinally-expanding spring with collars upon each side, which are pressed against the heart and the driving-pinion, so as to set the staff and hand in motion, substantially as herein described.

2. In a stop-watch, the central staff having the seconds-hand and the returning-heart secured to it, the driving-pinion turning loosely about it, a spring acting longitudinally between collars so as to force them in contact, respectively, with the driving-pinion and the cam, in combination with levers fulcrumed so that their ends press upon the outer faces of the collars and force them together against the tension of the spring and out of contact with the pinion and heart, substantially as herein described.

3. In a stop-watch, the staff carrying the independent seconds-hand and returning-heart and having the driving-pinion turning loosely upon it, the longitudinally-expanding spring, and the collars between which it acts, in combination with levers fulcrumed so that at one end they extend outside of the collars and at the opposite end they are moved to or from each other, substantially as herein described.

4. In a stop-watch, the staff carrying the seconds-hand and returning-heart and having the driving-pinion turning loosely upon it, the longitudinally-expanding spring, collars, and operating-levers W and X, having lugs or projections *o* and *n*, as shown, in combination with the wheel having teeth P, beveled or inclined so as to pass between the lugs, substantially as herein described.

5. In a stop-watch, the staff carrying the seconds-hand and returning-heart and having the driving-pinion turning loosely upon it, the longitudinally-expanding spring, and the friction-collars, the levers, and toothed wheel by which these collars are compressed or allowed to expand, as shown, in combination with the lever R, disk, and ratchet-wheel, substantially as herein described.

6. In a stop-watch, and in combination with the independent seconds-hand, staff, and the heart-shaped returning-cam, the lever N, having the end which presses upon the cam formed with points and curves to fit the curves of the heart, substantially as herein described.

In witness whereof I have hereunto set my hand.

JOHN TIXIER.

Witnesses:
H. TIXIER,
J. H. BLOOD.